Figure 1:
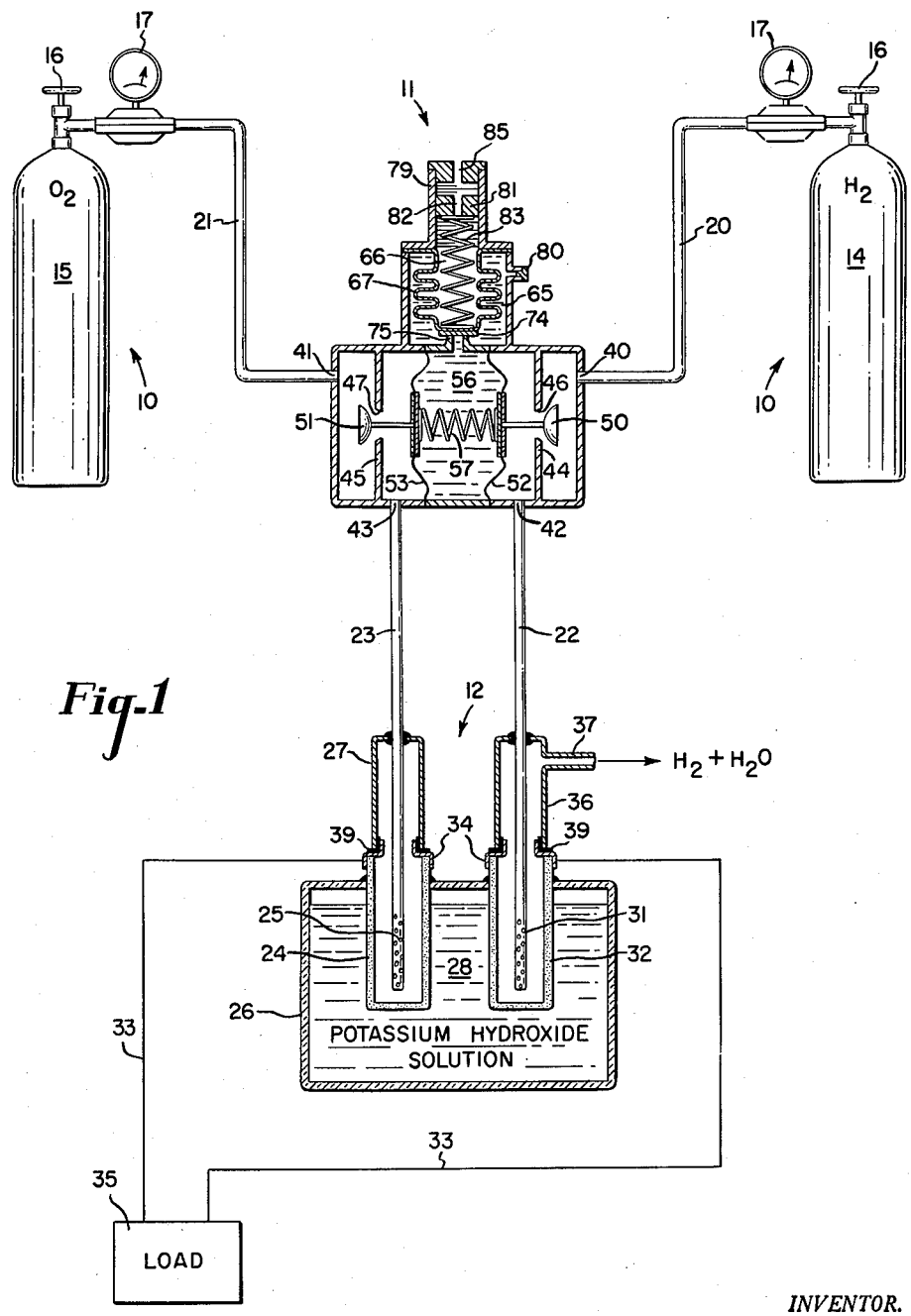

United States Patent Office 3,087,004
Patented Apr. 23, 1963

3,087,004
PRESSURE REGULATOR CONTROL SYSTEM
FOR A FUEL CELL
Joseph O. Thorsheim, Minneapolis, Minn., assignor to Minneapolis-Honeywell Regulator Company, Minneapolis, Minn., a corporation of Delaware
Filed Apr. 4, 1961, Ser. No. 100,613
4 Claims. (Cl. 136—86)

The present invention is directed to a control system for fuel cells that utilize two fluid fuels. More specifically, the present invention is directed to a pressure regulating type valve that simultaneously controls both fluids to a fuel cell, and keeps the fuel flow constantly referenced to a third pressure or adjustment.

The conversion of fuels into electricity has for a long period of time been accomplished by burning the fuels and subsequently converting the heat generated into a source of driving power for an electric generator. Due to the inherent losses of this type of system, the net useable energy from the system is approximately 30 percent of the fuel's total energy. This type of arrangement obviously is inefficient and as such, investigations have long been underway into means of converting fuels directly into electrical energy without passing through the stage of heat conversion. For many years the transformation of fuel directly into electrical energy has been theoretically recognized and various types of cells for this type of operation have been tested. Basically, the cells are referred to as fuel cells, a simple battery being one special case of a fuel cell.

One general type of fuel cell is an arrangement wherein two fluids are caused to react to generate an electric current. Probably one of the most common types of fuel cells is a cell wherein hydrogen and oxygen are fed into cavities that form electrodes for the unit. These electrodes normally are of a material such as carbon and allow for the hydrogen and oxygen to pass into their surface, since carbon can be made as a rather porous material. The hydrogen and oxygen then come in contact with an electrolyte, which can be such a material as potassium hydroxide. The reducing agent or fuel loses an electron at the electrolyte-electrode interface. The oxidant gains an electron at the opposite electrode forming an anion. The internal circuit is completed by ionic conduction. For convenience, this reaction will be referred to as a chemical reaction with the electrolytic material. The material from this type of cell is a flow of hydrogen and water vapor from one electrode structure and an excess of oxygen from the other electrode structure. While the hydrogen and oxygen type of cell is now quite common, it is understood that the present invention is not directed to this type of gas fueled cell alone, but is directed to any type of fuel cell that utilizes two or more fluid fuels in their operation.

In the present invention the exact type of fuel cell is not of great importance, but one will be described in some slight detail in order to correlate the material as to the inventive control system. The present invention lies in control of the fuels, in fluid form, to a fuel cell that utilizes two fuels as a source of energy. In order to understand the need for a control system it is pointed out that upon loss of control of the pressures of the two fluids being fed to a cell, the output of the fuel cell can drop rather dractically. The fuel cell, when operating properly, can have a practical efficiency as high as approximately 80 percent or more. As a loss of control occurs, this output can drop substantially. In addition to a loss of output, a fuel cell can be mechanically injured by the application of an unbalance of fuels to the cell. More specifically, it is quite hazardous to a fuel cell if one of the fuels is suddenly interrupted or its pressure lost without being able to immediately shut down the second fuel to the cell. It is therefore important that any control system which keeps a balance of fuels between the two inputs of a fuel cell also be capable of immediately sensing the loss of one of the fuels and therein cutting off promptly the second fluid to the cell.

A straightforward solution of this problem has been suggested, but the solution is rather clumsy and expensive. The straightforward solution would be to use two pressure sensing elements that convert pressure to electrical signals. The electrical signals would in turn be used to control two electrically driven regulating valves. This arrangement would provide the necessary control of the two relative pressures of the fuels to the fuel cell, and would be capable of shutting off either of the fuels in case of loss of the other fuel. It is apparent, however, that this arrangement involves many pieces of equipment and would be expensive to build. Since fuel cells are expected to be used as a source of driving power in highly competitive equipment, it is necessary to find a control that is cheap, simple, has almost an instantaneous response and which takes very little space. In addition it is necessary to have a control which can be regulated in response to an external control signal so that the level of pressure regulation can be readily adjusted for various conditions of operation. In some cases it is advantageous to maintain a constant pressure difference between the gases.

It is the primary object of the present invention to provide a control system for a fuel cell which utilizes two fluid fuels in the form of gases such as hydrogen and oxygen, and which is exceedingly simple, inexpensive, and rapid in response.

A further object of the present invention is to provide a single fuel control for a fuel cell that will automatically regulate the two fuels to the cell in response to a pre-established reference or pressure.

Yet another object of the present invention is to supply a control system that continuously monitors the safety of the regulating device and automatically shuts down both of the fuels to the fuel cell if a diaphragm of the regulating device ruptures.

Still a further object of the present invention is to provide a fuel cell control that can be readily adjusted over a wide range by the use of a control gas or by a simple mechanical adjustment.

And yet another object of the present invention is to disclose a pressure regulating valve of a unique design wherein two fluids are simultaneously controlled against a reference that can be put into the control device.

Another object is to disclose a valve of unique design wherein two fluids are simultaneously controlled at pressures with a constant difference and controlled against a reference pressure.

Still a further object of the present invention is to disclose a regulating valve that simultaneously controls two separate fluids and provides an automatic fail-safe function closing down both of the fuels to the cell upon the rupture of a diaphragm in the control device.

Another object of the present invention is to provide a pressure regulating valve that has a pressure control means of an adjustable nature that establishes the control point for the pressure regulator and also is self-sealing to prevent damage to the regulating device in case of a sudden change in a pressure supplied for control purposes.

These and other objects will become apparent when a full consideration is undertaken of the present specification and drawings.

Figure 2:
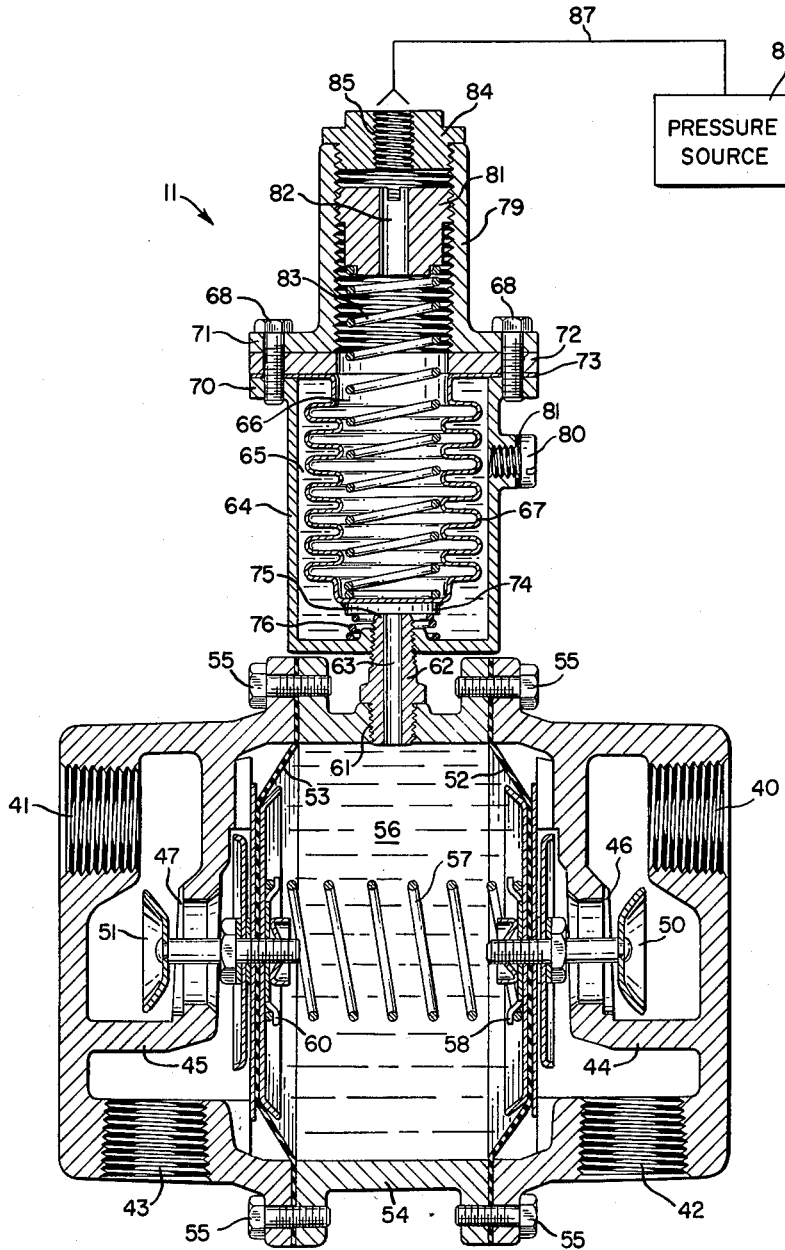

In FIGURE 1 there is disclosed, in schematic form, a hydrogen-oxygen supply system, a fuel control device, and a hydrogen-oxygen fuel cell, and;

FIGURE 2 is a cross-section of the fluid control device schematically represented in FIGURE 1.

In FIGURE 1 there is generally disclosed in schematic form a fluid fuel supply means 10, a control device 11, and a fuel cell at 12. The fuel supply means 10 consists of a pressurized bottle of hydrogen 14 and a pressurized bottle of oxygen 15. These pressurized bottles each have a control valve 16 and a pressure regulator 17. By opening the valve 16 a rough regulation of pressure output can be obtained by setting the pressure regulator to a desired level. This places a very roughly regulated hydrogen pressure in pipe 20 and a similarly regulated pressure of oxygen in pipe 21. The pipes 20 and 21 feed into the control device 11 which functions in a manner which will be described in detail in connection with FIGURE 2. At this point it is enough to state that the output of the control device 11 is to pipes 22 and 23 to the fuel cell 12. The fluid output of hydrogen and oxygen in pipes 22 and 23 is carefully regulated by the device 11 and upon failure of a diaphragm within device 11 the unit automatically closes itself off thereby closing off the supply of hydrogen and oxygen to the fuel cell 12. The oxygen from pipe 23 is fed to a carbon electrode 24 through holes 25 in the end of pipe 23. The oxygen in the electrode 24 diffuses into the walls of the carbon electrode with a potassium hydroxide solution 28 that fills a container 26 into which the electrode 24 is sealed. The excess hydrogen passes from the electrode 24 to an upper chamber 27.

The hydrogen supplied through pipe 22 is fed through holes 31 into a chamber formed by an electrode 32. The electrode 32 allows the hydrogen to diffuse into its surface with the potassium hydroxide solution 28. Here the hydrogen unites with hydroxyl ions which have migrated through the electrolyte from the electrode 24 and releases an electron. The electron is the work performing product of the fuel cell and flows in an external electric circuit. This circuit is disclosed as wires 33 connected to the top of the electrodes at 34 and going to an electrical load 35. The excess hydrogen and a byproduct, in the form of water, pass into the upper chamber 36 that is attached to the top of the electrode 32 and passes out of the pipe 37 to the atmosphere. The electrodes 24 and 32 are electrically insulated by insulating members 39 to keep the upper chambers 27 and 36 separate, from an electrical standpoint, from the electrodes 24 and 32.

It is understood that the pressure of the hydrogen and the oxygen in pipes 22 and 23 must be kept closely regulated and must be maintained within very close limits of a set control point. It is also understood that upon a rupture of any of the diaphragms contained in the novel control device 11, that the pressure to pipes 22 and 23 must be immediately cut off so that damage is avoided in the fuel cell unit itself. The presently disclosed control device 11 provides both the control and safety function in a very simple manner.

The control device 11 as shown in detail in FIGURE 2, is a pressure regulator for simultaneously controlling two separate fluids. The regulator has two inlets 40 and 41 and accompanying outlets 42 and 43. Pipe 21 of FIGURE 1 is connected to inlet 41, while pipe 23 of FIGURE 1 is connected to outlet 43. Similarly, inlet 40 is connected to pipe 20 of FIGURE 1, while the outlet 42 is connected to pipe 22. Between the inlets and outlets are two separate partitions 44 and 45 which separate the two fluid control paths with intermediate valve seats 46 and 47. Associated with valve seat 46 is a valve 50, while associated with valve seat 47 is a valve 51. Each side of the control device disclosed so far in FIGURE 2 is capable of simultaneously controlling the hydrogen and oxygen from the pressure sources or bottles 14 and 15.

The valve means 50 is mounted in a conventional manner to a diaphragm 52 while the valve 51 is mounted to a diaphragm 53. The mounting means will not be described in detail but have been shown in the drawing in their usual form as a group of discs held together by a threaded stem and nut arrangement. The diaphragms 52 and 53 form moveable walls for each of the separate fluid handling sections and provide a dual pressure regulating type of unit.

An annular ring 54 of FIGURE 2 is mounted in the center of the pressure control device 11 and with bolts 55, clamp the diaphragms 52 and 53 in place. The space between the diaphragms 52 and 53 and confined in the ring 54 form a fluid tight safety chamber 56, whose function will be described in detail in a subsequent portion of the present description. Included in the safety chamber 56 is a spring 57 that is hooked over a pair of plates 58 and 60 that are attached to the valve means 50 and 51. The spring 57, in the position shown, is expanded and has a force existing in it which tends to pull the diaphragms 52 and 53 together thereby tending to close the valve means 50 and 51 against their appropriate valve seats 46 and 47. Threaded into the annular ring 54 at 61 is a coupling 62 that has a center open passage 63 that connects into a housing generally shown at 64. The housing 64 forms a pressure control means made up of a chamber 65 and a chamber 66. The chambers 65 and 66 are separated by a bellows 67 that is clamped by bolts 68 between flanges 70 and 71 of the housing 64. The housing 64 further has a spacing ring 72 that forms part of the clamping arrangement that seals a flange 73 of bellows 67 in a fluid tight relationship thereby separating the two chambers 65 and 66.

At the lower end of bellows 67 there is placed a valve member 74 that is able to meet with a valve seat 75 that is formed in the end of the coupling 62. The valve 74 and seat 75 form a means of cutting off the passage 63 that connects the chamber 65 with chamber 56. A spring 76 is provided around the end of the coupling 62 and presses upwardly against the valve 74. The spring 76 is utilized to guarantee that the valve 74 does not stick closed against the valve seat 75 under certain conditions of operation. A screw 80 is threaded with a gasket 81 into the side of the chamber 64 and provides a means for introducing a liquid fill to the chambers 65 and 56. The liquid fill forms the safety feature of the present device and its function will be described in some detail later in the present specification.

The upper portion of the control device 11 has a threaded housing 79 and an adjustable plug 81 threaded into the housing. The plug 81 further has a central opening 82 which communicates with the control chamber 66. A compression spring 83 is appropriately restrained between the plug 81 and the end of the bellows 67 thereby providing a bias on the bellows forcing it in a downward direction to seal the valve 74 against the valve seat 75. A fluid tight plug 84 is provided and has a threaded opening 85 that can be connected either to the atmosphere, when the control device 11 is regulating against atmospheric pressure, or to a pressure source 86 that is schematically represented as being connected by pipe 87 to the threaded portion 85 of the plug 84. The pressure source 86 can supply a pressure to the chamber 66 which aids the spring 83 to force the bellows 67 in a downward direction. It is understood that all of the joints in the present device are fluid tight and their details are conventional in the valve art.

A safety fluid, which is compatible with the fuels being valved by the control device 11, is introduced through the plug 80 and fills the chamber 56 and the chamber 65. This fluid is introduced under sufficient pressure to overcome the spring 57, and thereby tend to spread the diaphragms 52 and 53 apart opening the valve means 50 and 51. The fluid in the chambers 56 and 65 thus form a safety device wherein the fluid pressure overcomes the spring 57. It will be apparent that when the fluid in the device separates the diaphragms 52 and 53 opening the control valves, that the unit has in effect a bias placed on it that will be lost if either of the diaphragms 52 or 53 ruptures. Obviously if either of the diaphragms ruptures and the safety fluid leaks out, the spring 57 will pull the valve means 50 and 51 together thereby closing the valve means 50 and 51 of control device 11.

It will be further understood that when fluid pressures are applied to pipes 20 and 21, thereby applying fluid pressures to the outer surfaces of diaphragms 52 and 53, that the diaphragms tend to push inwardly compressing the spring 57. This tends to force the fluid in chamber 56 back into the chamber 65 against the spring 83 and any pressure from pressure source 86 that may be present. As previously stated pressure source 86 may in fact be the atmosphere thereby allowing the entire regulation of pressure to be determined by the position of the plug 81 against the spring 83. It will thus be appreciated that whenever fluid fuels are being supplied to the control device 11 by means of pipes 20 and 21, that the two regulators cause a continuous variation in the position of the diaphragms 52 and 53. This variation is reflected in a fluid pressure through the safety chamber arrangement back in against the bellows 67. The spring 83 and the pressure source 86 thus cause a bias to be established on the control device 11. The sudden application of a higher pressure to the device 11 by means of pipes 20 or 21 causes an immediate closing of the appropriate valve means 50 or 51 against its seat 46 or 47. This regulates the flow of fluid out of the outlets 42 or 43 thereby keeping a constant fuel pressure in the fuel cell. If it is desired to change the level of regulation of the control device 11, it is only necessary to either provide a change in gas pressure from the pressure source 86 or to adjust the position of the plug 81 thereby changing the bias in the chamber 66 which in turn changes the fluid pressure response of the safety fluid in safety chamber 56.

It will thus be apparent from a consideration of the present application that a three way type of pressure regulating device has been provided that has a fail-safe feature. It is also noted that by applying the bias to the chamber 66 after the gas pressure has been applied on pipes 20 and 21, it will be possible to slowly open the valve means 50 and 51 from their appropriate seats 46 and 47 by increasing the fluid pressure in the chamber 56. It is thus possible to arrange for simultaneously applying fluid pressures to a fuel cell and thereby causing the cell to operate without malfunction due to a lack of one or the other of the fuels at the first instant of operation. Since valve means 50 and 51 have a common diaphragm means made up of the diaphragms 52 and 53 alone with the liquid in chamber 56, if pressure is lost to either inlet 40 or 41 the unit 11 will close the valve means on the opposite side thereby closing unit 11 completely to protect the fuel cell 12. It should be further noted that it is possible to change the control device 11 so that the two regulating sections of the valve means 50 and 51 can regulate at different levels of pressure if need be. This can be readily accomplished by adding a biasing spring between the valve means 50 or 51 and the wall of the control device 11. This spring would work in opposition to the fluid pressure on the inside of the control or safety chamber 56. Springs have not been shown in the present case for clarity's sake, but the addition of a bias spring to a pressure regulating device is well known in the pressure regulating art.

While one embodiment of a pressure regulating device for simultaneously controlling two separate fluids has been disclosed in one specific form, the applicant wishes to point out that the broad principles of applying pressure between two movable walls for both bias and safety could be accomplished in many individual configurations. As such the applicant wishes to be limited in the scope of this invention only by the appended claims.

The embodiments of the invention in which an exclusive property or privilege is claimed are defined as follows.

I claim:

1. A pressure control system for a fuel cell wherein two fluids chemically react with an electrolytic material to liberate electrical energy which can flow through an external electric circuit comprising: supply means including two fluid fuels supplied for consumption in said fuel cell; a pressure regulator for simultaneously controlling said two fluids including two separate fluid control portions each having an inlet connected to said supply means and an outlet connected to said cell; said inlets and said outlets each separated by partition means which each have a valve seat therein; separate valve means co-operable with each said seat to control one each of said fluids; each said valve means attached to moveable wall means which form sides of said portions; said wall means and said portions further defining a safety chamber; bias means urging said wall means toward each other thereby tending to close said valve means upon said valve seats; and external pressure control means connected to said safety chamber and containing a noncompressible liquid fill different from said controlled fluid; said pressure control means applying a pressure to said liquid to move said liquid into said safety chamber to overcome said bias means.

2. A pressure control system for a fuel cell wherein two fluids chemically react with an electrolytic material to liberate electrical energy which can flow through an external electric circuit comprising: supply means including two fluid fuels supplied for consumption in said fuel cell; a regulator for simultaneously controlling said two separate fluids including two separate fluid control portions each having an inlet connected to said supply means and an outlet connected to said cell; said inlets and said outlets each separated by partition means which each have a valve seat therein; separate valve means co-operable with each said seat to control one each of said fluids; each said valve means attached to and moveable with separate diaphragms which each form a side of said portions; said diaphragms and said portions further defining a liquid tight safety chamber; bias means in said chamber and between said diaphragms urging said diaphragms toward each other thereby tending to close said valve means upon said valve seats; a control unit having two variable volume control chambers separated by a moveable wall; a first said control chamber connected to said safety chamber and including safety valve means attached to said wall to isolate said connected chambers; a liquid filling said safety chamber and said first control chamber; and second bias means applied to a second control chamber to move said wall to compress said first control chamber and to move some of said liquid into said safety chamber to overcome said first bias means; said safety valve means being closed by said first control chamber movement to prevent any excess liquid movement into said safety chamber; said first bias means closing both said valve means thereby stopping fluid flow through said regulator to said fuel cell if either of said diaphragms is ruptured.

3. A pressure control system for a fuel cell wherein two fluids chemically react with an electrolytic material to liberate electrical energy which can flow through an external electric circuit comprising: supply means including two fluid fuels supplied for consumption in said fuel cell; a pressure regulator for simultaneously controlling said two fluid fuels including two separate fluid control portions each having an inlet connected to said supply means and an outlet connected to said cell; said inlets and said outlets each separated by partition means which each have a valve seat therein; separate valve means co-operable with each said seat to control one each of said fuel fluids; each said valve means attached to moveable wall means which form sides of said portions; said wall means and said portions further defining a safety chamber; bias means urging said wall means toward each other thereby tending to close said valve means upon said valve seats; control means including two variable volume control chambers separated by a moveable wall; a first said control chamber connected to said safety chamber; a liquid filling said safety chamber and said first control chamber; and second bias means including a control fluid applied to a second control chamber to move said control chamber wall to compress said first control chamber and to move said liquid into said safety chamber to overcome said first bias means.

4. A pressure control system for a fuel cell wherein two gases chemically react with an electrolytic material to liberate electrical energy which can flow through an external electric circuit comprising: supply means including two fuel gases for consumption in said fuel cell and a control gas; a single, adjustable pressure regulator for simultaneously controlling said two separate fuel gases including two separate gas control portions each having an inlet connected to said supply means and an outlet connected to said cell; said inlets and said outlets each separated by partitions which each have a valve seat therein; separate valves co-operable with each said seat to control one each of said gases; each said valve being attached to and movable with separate diaphragms which each form a side of said portions; said diaphragms and said portions further defining a liquid tight safety chamber; a first spring in said chamber and between said diaphragms urging said diaphragms toward each other thereby tending to close said valves upon said valve seats; a control unit having two variable volume control chambers separated by a bellows; a first said control chamber connected to said safety chamber and including safety valve means attached to said bellows to isolate said connected chambers; a liquid filling said safety chamber and said first control chamber; said supply means connecting said second control chamber to said control gas so that said control gas can bias said second control chamber position; and a compression spring in said second control chamber to help move said bellows to compress the liquid in said first control chamber and to move some of said liquid into said safety chamber to overcome said first spring; said safety valve means being closed by said first control chamber movement to prevent any excess liquid movement into said safety chamber; said first spring closing said valves thereby stopping gas flow through said regulator if either of said diaphragms is ruptured.

References Cited in the file of this patent
UNITED STATES PATENTS

| | | |
|---|---|---|
| 1,182,759 | Emanuel | May 9, 1916 |
| 2,313,797 | Bailey | Mar. 16, 1943 |
| 2,384,463 | Gunn et al. | Sept. 11, 1945 |
| 2,870,777 | Gold et al. | Jan. 27, 1959 |
| 2,913,511 | Grubb | Nov. 17, 1959 |